United States Patent
Keller et al.

(10) Patent No.: US 8,371,148 B2
(45) Date of Patent: Feb. 12, 2013

(54) INSTALLATION PART FOR RECEIVING A ROLL JOURNAL

(75) Inventors: Karl Keller, Hilchenbach (DE); Daniel Knie, Freudenberg (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 1090 days.

(21) Appl. No.: 12/226,130

(22) PCT Filed: Apr. 5, 2007

(86) PCT No.: PCT/EP2007/003100
§ 371 (c)(1),
(2), (4) Date: Oct. 7, 2008

(87) PCT Pub. No.: WO2007/115791
PCT Pub. Date: Oct. 18, 2007

(65) Prior Publication Data
US 2009/0158801 A1 Jun. 25, 2009

(30) Foreign Application Priority Data
Apr. 8, 2006 (DE) .......................... 10 2006 016 714

(51) Int. Cl.
*B21B 27/06* (2006.01)
*B21B 45/02* (2006.01)

(52) U.S. Cl. ............................... 72/236; 72/41; 384/397

(58) Field of Classification Search ................ 72/39, 41, 72/43, 44, 236; 384/137, 322, 397, 400
See application file for complete search history.

(56) References Cited

U.S. PATENT DOCUMENTS
4,422,318 A * 12/1983 Christ et al. ................ 72/200
4,944,609 A 7/1990 Salter et al.

FOREIGN PATENT DOCUMENTS
| EP | 0 285 333 | 3/1988 |
| JP | 57 195918 | 12/1982 |
| JP | 2000 263108 | 9/2000 |
| WO | 2004/065031 | 8/2004 |

* cited by examiner

*Primary Examiner* — Debra Sullivan
(74) *Attorney, Agent, or Firm* — Lucas & Mercanti, LLP; Klaus P. Stoffel

(57) ABSTRACT

In an installation part (1) in a rolling stand for receiving a roll journal (24) having a journal bush (24) of a roll which is used in the processing of steel and non-ferrous metals, wherein the installation part (1) has a cambered side (3) which faces the roll and a run-out side (4) which lies opposite the cambered side (3), having lubricant receiving spaces (7, 15, 16) on the cambered side (3), at least one housing tongue (23) is provided on the cambered side (3) for the at least partial delimitation of the lubricant receiving spaces (7, 15, 16) with respect to one another and for the formation of a gap (25) with the journal bush (24), the width of which gap (25) is below a predefined gap width threshold value.

6 Claims, 5 Drawing Sheets

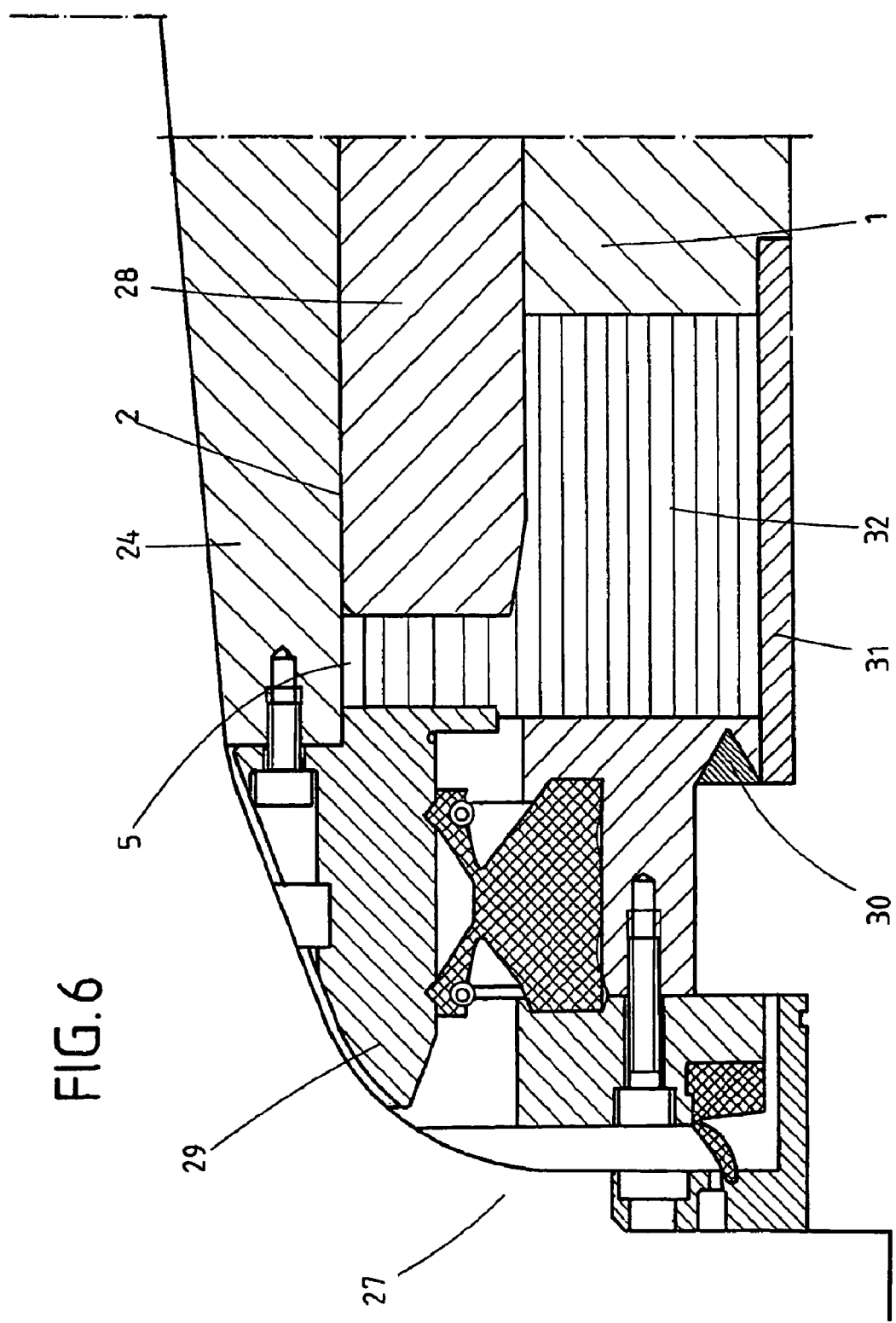

INSTALLATION PART FOR RECEIVING A ROLL JOURNAL

BACKGROUND OF THE INVENTION

The invention concerns a chock in a rolling stand for receiving a roll neck with a neck lining of a roll used in steel and nonferrous metal processing, where the chock has a roll body side that faces the roll and a discharge side that lies on the opposite side from the roll body side, with lubricant receiving chambers on the roll body side.

Roll neck bearings, especially Morgoil roll neck bearings, have been used for decades in rolling mill construction. In this regard, all load-carrying bearing parts, including the mounting elements and seals, are housed in a bearing housing, the so-called chock.

Neck linings are mounted on the journal of the rolls, i.e., the roll neck. Together with the bearing bush, the neck linings form a journal bearing, with the bearing bush being fixed in the chock. In this connection, the bearing bush encloses the neck lining.

Between the outer surface of the neck lining and the inner surface of the bearing bush, there is an oil film, which prevents metallic contact of the bearing linings. The oil is continuously forced through the bearing. This means that the oil is circulating. The oil enters the journal bearing through oil inlet pockets, which are located in the bearing bush and are supplied with oil from an oil reservoir through lines that are formed as bores in the chocks.

The constant pressure of the oil pumps forces the oil onto the bearing linings, where it spreads out. Excess oil emerges at the two lateral edges, where it is collected and returned to the oil reservoir through outlet lines.

To prevent oil from escaping from the bearings and getting onto the rolling stock, a seal is provided on the roll body side. A journal bearing can be sealed by a rubber profile produced by compression molding. The seal causes oil emerging from the bearing to enter cavities in the chock, from which it is further conveyed.

EP 0 285 333 B1 describes a bearing bush, which is divided into two pressure zones by an annular channel located in the bearing center. About 50% of the oil flowing off from the bearing is carried away through this annular channel. The sealing system on the roll body side is now loaded with only about half the usual amount of oil. The possibility of uncontrolled escape of oil is reduced.

In this connection, it is necessary to provide each of the two zones of the bearing bush with its own inlet, through which oil is supplied to the inner bearing surface. In addition, outlets are provided in the annular channel for removing the oil.

These additional measures result in increased manufacturing expense.

WO 2004/065 031 A1 discloses a chock for receiving the roll neck of a roll used in steel and nonferrous metal processing, comprising at least one lubricant receiving chamber on the roll body side and at least one lubricant receiving chamber on the discharge side, which are located beneath the lowest bearing point, and connecting bores between the lubricant receiving chambers on the roll body side and the discharge side, where, on the roll body side of the chock, the lubricant is collected in additional lubricant receiving chambers in the chock. The additional lubricant receiving chambers are located above or at the level of the center plane. This has the effect that the oil emerging at the top, above the center plane, is spared the long travel distance to the lowest bearing point and thus avoids interference by other emerging oil. In a chock, the lubricant, i.e., the oil, must be brought to the point at which the greatest pressure and the greatest friction between the roll neck and the chock occur. In the case of an upper chock, this point is always at the top, i.e., above the center plane, because the rolling force is upwardly directed and therefore the lubricant, i.e., the oil, is forced out of the bearing by the force and would have to move a long distance down to the lowest bearing point. There is a risk of oil escaping from the seal on its way to the bottom.

In the operation of a rolling mill, the function of the seal on the roll body side can be disrupted. For example, a rise of the oil in the collecting chamber in an oil sump can cause the sealing lip of the seal on the roll body side to leak. Another type of disruption involves wear of the sealing lips of a seal. The properties of the sealing lip change in a way that allows oil to escape. This results in oil leakage and large oil losses. In cold rolling mills, the escape of oil can cause fouling of the strip, which impairs the quality of the product.

In previously known chocks, the oil collected in collecting chambers on the roll body side is further conveyed by two bores that join the roll body side with the discharge side. The bores are located below the lowest bearing point. The oil flows through the bores to an oil collecting chamber on the outside of the chock. From there, the oil is carried by flexible hoses into the return line to the oil reservoir via one or two bore connections. The previously known bores are provided on the right and left in the chock (cf. FIG. 2 of WO 2004/065 031, lubricant receiving chambers 20 and 21, with the associated bores 10, or the bores 40 in FIGS. 4A, 4B of EP 0 285 333). In both embodiments, the horizontal distance between the oil return bores is greater than the diameter of the roll neck.

The prior-art arrangement and design of the lubricant return bores in this position means that the chocks cannot be altered in the lower region without shifting the lubricant return bores.

SUMMARY OF THE INVENTION

Therefore, the objective of the invention is to design a chock of the aforementioned type in such a way that excess lubricant from the chock is completely or almost completely returned to the lubricant reservoir and that the position or location of the lubricant return bores does not interfere with the contour of the lower region of the chock.

In accordance with the invention, this objective is achieved by at least one housing tongue on the roll body side, which is designed in such a way that the width of the gap with the neck lining is less than a predetermined threshold value. As a result of the small gap width, the lubricant present in the lubricant receiving chamber is carried away. After it has emerged between the neck lining and the bearing bush, the lubricant is carried away by the housing tongue basically to the lubricant return bores and is thus prevented from remaining in the upper lubricant receiving chamber. Due to a permanent circulation, new lubricant is always present in these areas. Due to the small gap, only a small portion of the total amount of circulated lubricant reaches the lower lubricant receiving area and is carried away from there.

In a modification of the invention, the housing tongues form the largest possible length of the gap to the rotating neck lining diameter of the seal on the roll body side. As a result of this measure, only a limited amount of lubricant passes through the gap and reaches the next region of the lubricant receiving chamber. Due to the design of the lower region of the chock, only small bores or small openings are provided, which also can receive and carry away only a small amount of lubricant. At least 80%, and preferably 90%, of the lubricant is guided by the housing tongues to the upper lubricant return bores. The remainder of the lubricant is carried to the lubricant reservoir via the lower lubricant return bore(s).

To be able to replace damaged or defective housing tongues, a further modification of the invention provides that the housing tongue is designed as an individual part that can be replaced. To this end, it is provided that the housing tongue can be replaced from the outside without dismantling the whole chock.

In order to reduce the passage of lubricant in the area of the housing tongues still further, in a preferred design, the replaceable housing tongue is designed as a contact seal. Instead of a rigid housing tongue that leaves a small gap, a contact seal is installed, which can be in contact with the rotating neck lining. For example, the contact seal consists of a seal support, on which a honeycomb seal made of metal foil is soldered. Other designs, such as plastic webs, rubber disks, or the like, can also be considered. In this regard, the contact seal exhibits a deformability that allows displacement of the roll spindle. The contact seal adapts itself to the changed mounting position.

In a special embodiment of the chock, the lubricant return bore is formed in the area of and preferably symmetrically to the vertical center plane of the chock. That is, the lubricant return bores, which were previously arranged outside the vertical projection plane of the roll neck, are shifted towards the center. This makes it possible for the contours of the lower region of the chocks to be altered in such a way, without weakening, that they can be installed, for example, in a changed mill housing window.

It was recognized that one lubricant return bore for carrying away the lubricant is sufficient for the amounts of lubricant in the lower part of the chock, which are reduced by the lubricant collecting chambers above the horizontal center plane.

In this connection, in a first embodiment, a lubricant return bore is provided in the vertical center plane. The diameter of this lubricant return bore is smaller than the diameter of the lubricant return bores that connect the lubricant chambers above or at the level of the center plane of the roll body side with the discharge side. The smaller diameter results from the smaller lubricant volume that must be removed from the lubricant receiving chamber below the lowest bearing point.

In a modification, it is proposed that the lower lubricant return bore be formed by three smaller parallel bores or a slot. This makes it possible for the chock to have a lower height in the area of the center plane than in an embodiment with only a single lubricant return bore.

In another modification, it is provided that the lubricant return bores are brought together on the discharge side. Compared to the previously known designs with four lubricant return bores, this has the advantage that fewer connectors are needed to connect the lubricant return bores that are brought together on the discharge side.

The invention is described in greater detail below with reference to the highly schematic drawings.

BRIEF DESCRIPTION OF THE DRAWING

FIG. 6 shows a cross-sectional side view of a chock according to FIG. 5 in the sectional position indicated there.

DETAILED DESCRIPTION OF THE INVENTION

Figure 1:
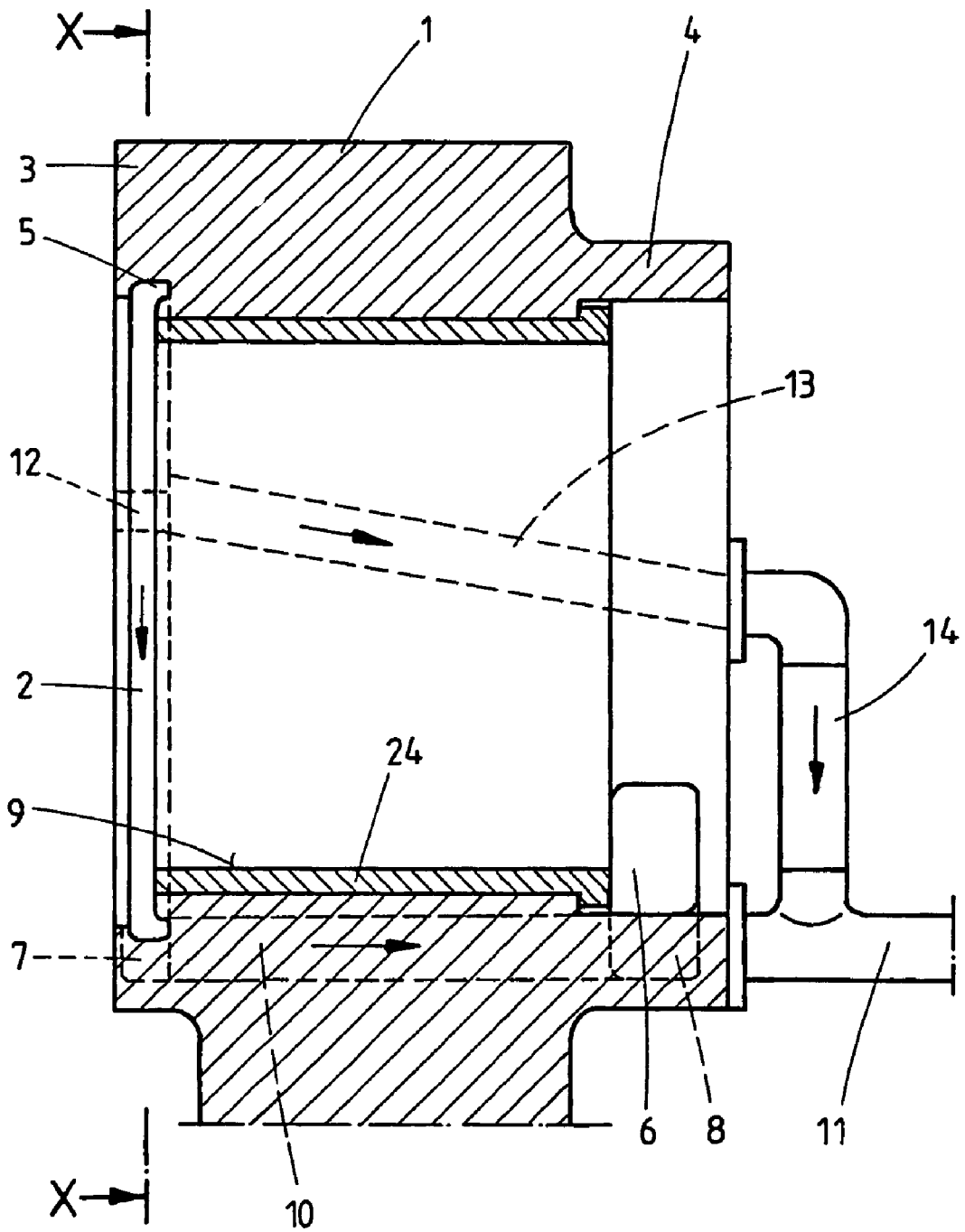
FIG. 1 shows a half section of a first embodiment of a chock.

FIG. 1 shows a chock 1, in which a roll neck 27 (not shown) is supported by a neck lining 24 and a bearing bush 28 (not shown). The neck lining 24 is nonrotatably connected with the roll neck 27, and the bearing bush 28 is fixed in the chock 1. Between the bearing bush 28 and the neck lining 24 there is a continuous film of lubricant. The lubricant 2 enters the gap between the bearing bush 28 and the neck lining 24 by a lubricant circulation system via lubricant feed pockets. With a symmetrical load distribution, half of the lubricant 2 would be distributed on the roll body side 3 and half on a discharge side 4. Circumferential lubricant collecting channels 5, 6 are formed in the chock 1 on the roll body side 3 and on the discharge side 4 for removing the lubricant 2. In the lower region, the lubricant collecting channels 5, 6 expand to form two lubricant receiving chambers 7, 8, which are located beneath the lowest point 9 of the inside diameter of the bearing bush 28.

The previously known bore 10, which is provided in the lower part of the chock 1, provides for flow of the lubricant 2 from the lubricant receiving chamber 7 on the roll body side 3 to the discharge side 4 of the chock 1. The lubricant 2 is collected on the discharge side 4 in the lubricant receiving chamber 8, from which it is carried by a tube or two flexible hoses 11 to a lubricant reservoir (not shown), where it can be cleaned and/or cooled and then carried back into the bearing.

Additional lubricant receiving chambers 12 are located above the center plane for additional removal of lubricant 2. These lubricant receiving chambers 12 communicate with the discharge side 4 through lubricant return bores 13. On the discharge side 4, the lubricant 2 is fed into the hose or hoses 11 through a connector 14.

Figure 2:
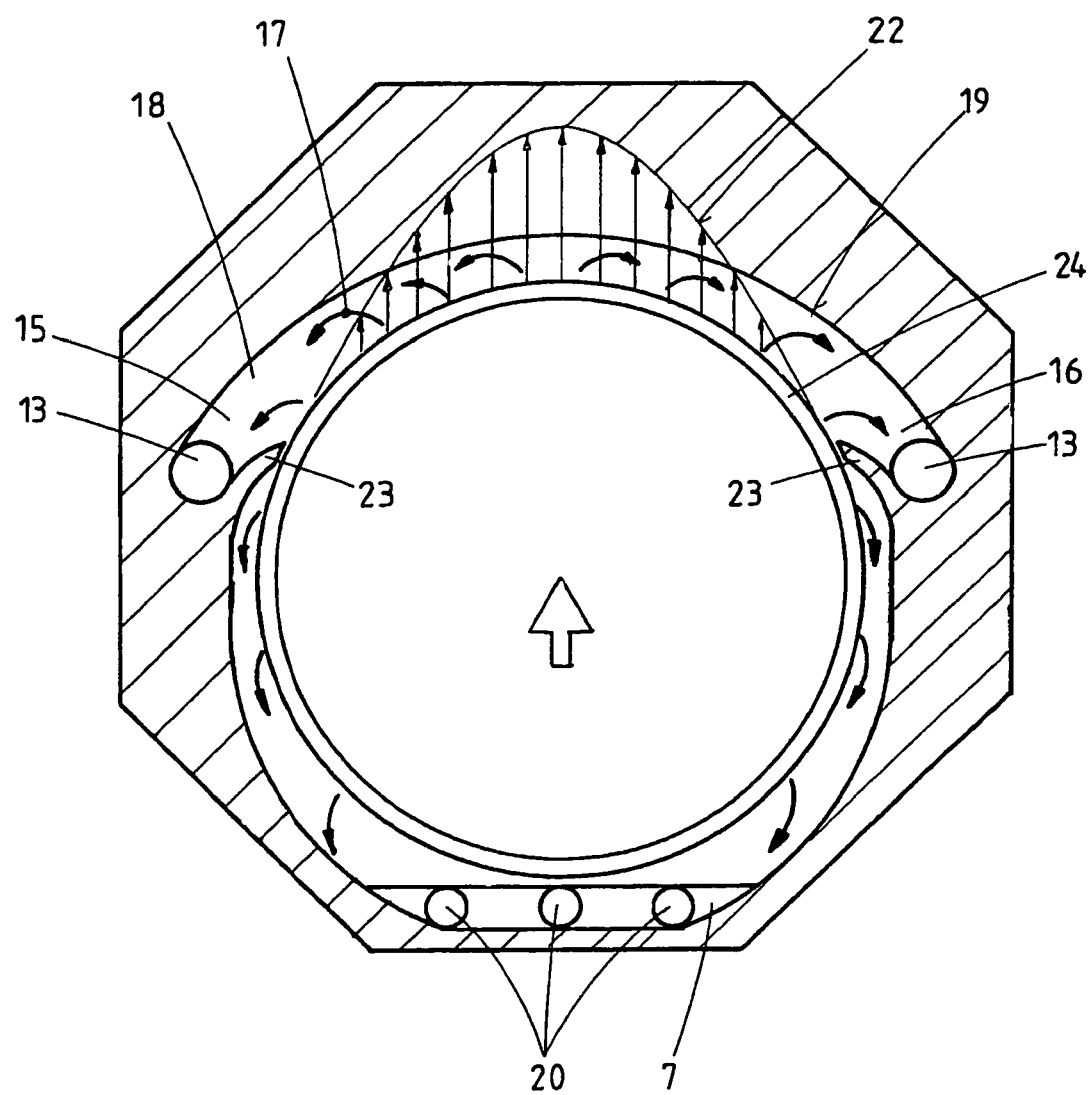
FIG. 2 shows a front view of the chock of FIG. 1 along sectional plane X-X.

FIG. 2 shows, as an example, the position of two additional lubricant receiving chambers 15 and 16 above the horizontal center plane. Depending on the direction of rotation of the roll, the drops 17 of lubricant are flung against the outer surfaces 18 or 19 of the lubricant collecting channel 5.

From there, the lubricant 2 can flow off into the lubricant receiving chamber 15 or 16. The lubricant 2 that emerges below the lubricant-receiving chambers 15 and 16 flows into the lower lubricant-receiving channel 7. The lubricant receiving chamber 7 on the roll body side 3 communicates with the lower lubricant receiving chamber 8 on the discharge side 4 by three parallel bores 20. If the illustrated chock 1 is provided as an upper chock 1, then the roll neck (not shown) acts with a force in the direction indicated with an arrow and produces a bearing force distribution, as illustrated, for example, by the curve 22. Only a small portion of the lubricant 2 reaches the lower lubricant receiving chamber 7 through the lubricant receiving chambers 15, 16 and the lubricant return bores 13. Therefore, the lower lubricant receiving chamber 7 can communicate with the lubricant receiving chamber 8, for example, through three small lubricant return bores 20.

Figure 3:
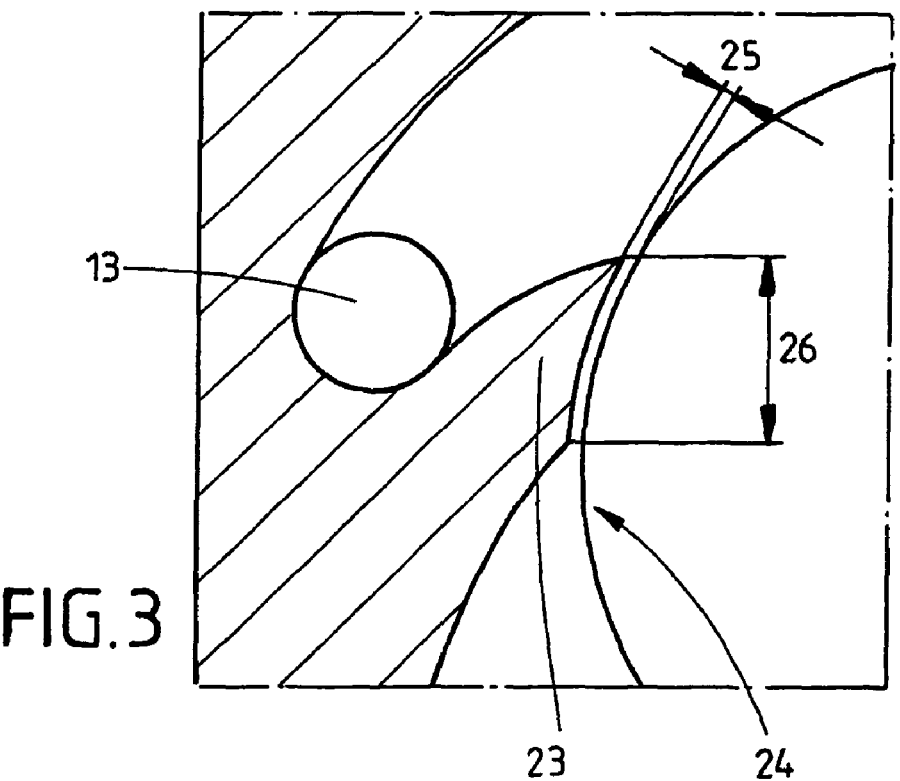
FIG. 3 shows a housing tongue in detail.

FIG. 3 shows the detail of a housing tongue. The housing tongues 23 are designed in such a way that a gap 25 of only the smallest possible width remains between the housing tongues 23 and the rotating neck lining or bearing bush diameter 24 of the neck seal. The smaller the gap 25, the more lubricant 2 is removed in the lubricant receiving chambers 15, 16. Furthermore, the gap length 26 should be formed as long as possible. The housing tongues 23 are arranged in such a way that as much lubricant 2 as possible is carried into the upper lubricant return bores 13. Only a small amount of lubricant 2 reaches the lower bores 20.

Figure 4:
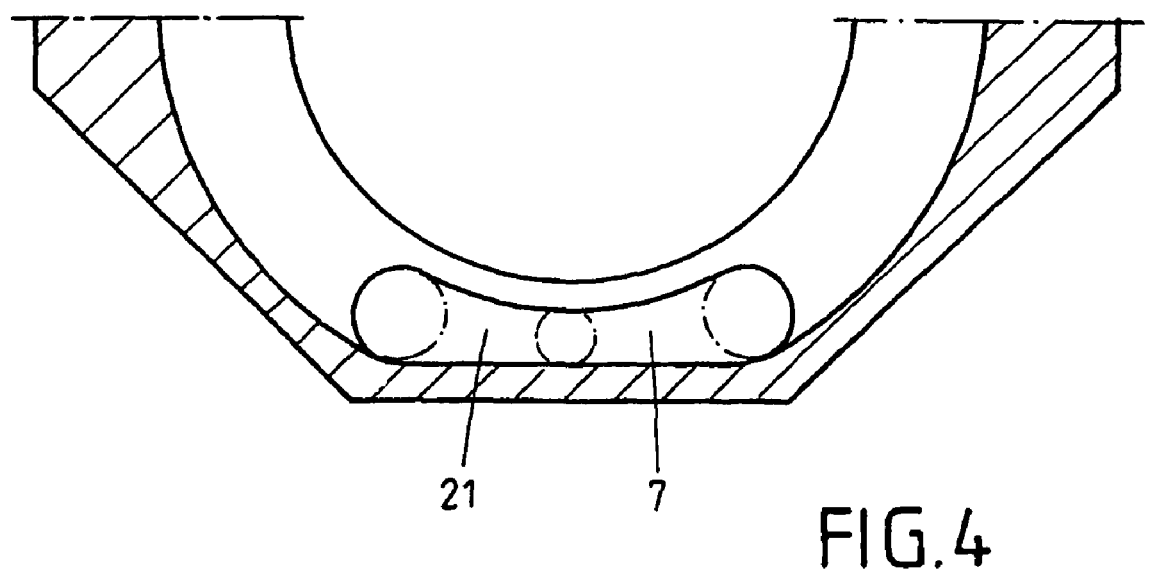
FIG. 4 shows another embodiment of a lower bore.

FIG. 4 shows an alternative embodiment with a slot 21 instead of the three small bores 20.

Figure 5:
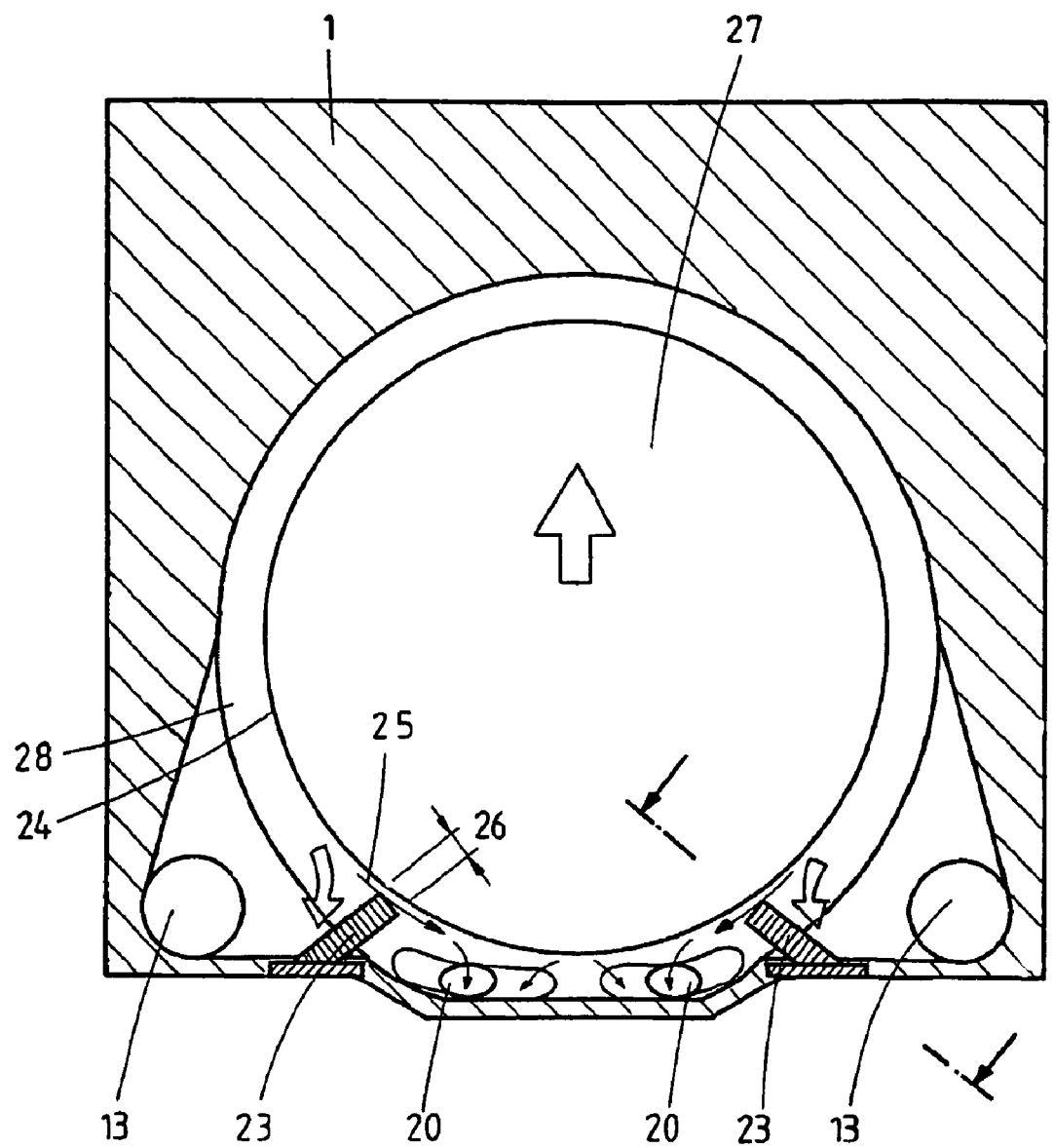
FIG. 5 shows a front view of a second embodiment of a chock.

FIG. 5 shows a front view of a second embodiment of a chock 1 with a roll neck 27, on which a neck lining 24 is mounted and rotates with the roll neck 27. A bearing bush 28, which is also stationary, is connected with the chock 1. In contrast to the first embodiment, the lubricant return bores 13 are located below the center plane of the roll neck. In the vertical center plane, small bores 20 or a slot is provided for removing the remaining amount of lubricant from the roll body side 3 to the discharge side 4. Housing tongues 23 are formed in the area between the lubricant return bores 13 and the small bores 20 or the slot. These housing tongues 23 are designed as replaceable parts and can be mounted and removed without dismantling the chock 1. The housing tongues 23 are shaped and oriented in such a way that they form a gap 25 with a gap length 26. Depending on requirements, the housing tongues can be made of various materials.

FIG. 6 shows a cross-sectional side view of a chock according to FIG. 5. The stationary chock 1 is designed with a stationary bearing bush 28. A neck lining 24, on which a neck lining extension 29 is fastened with bolts, is mounted on the roll neck 27. These parts rotate. Lubricant 2 is present between the neck lining 24 and the bearing bush 28 and flows into the lubricant collecting channel 5. As shown in FIG. 5, a housing tongue 23 projects into the lubricant collecting channel 5 and leaves a gap of, for example, about 1-2 mm. The housing tongue 23 can be mounted and removed as a separate part. The drawing shows a special housing tongue 23, which is designed as a seal 30 and consists of a seal support 31 and a contact seal 32, for example, a honeycomb seal made of metal foil. The two parts are soldered together.

List of Reference Numbers 1 chock
2 lubricant
3 roll body side
4 discharge side
5 lubricant collecting channel
6 lubricant collecting channel
7 lower lubricant receiving chamber
8 lower lubricant receiving chamber
9 lowest point of the bearing bush
10 lubricant return bore
11 hose
12 lubricant receiving chamber
13 lubricant return bore
14 connector
15 upper lubricant receiving chamber
16 upper lubricant receiving chamber
17 drop of lubricant
18 outer surface
19 outer surface
20 bore
21 slot
22 curve
23 housing tongue
24 neck lining
25 gap
26 gap length
27 roll neck
28 bearing bush
29 extension of neck lining
30 seal
31 seal support
32 contact seal

The invention claimed is:

1. A rolling stand with a chock (1) for receiving a roll neck (27) with a neck lining (24) of a roll used in steel and nonferrous metal processing, where the chock (1) has a roll body side (3) that faces the roll and a discharge side (4) that lies on the opposite side from the roll body side (3), with lubricant receiving chambers (7, 15, 16) on the roll body side (3) and at least one housing tongue (23) on the roll body side (3) for at least partially separating the lubricant receiving chambers (7, 15, 16) from one another, wherein the housing tongue (23) is designed as a contact seal (32).

2. A rolling stand in accordance with claim 1, wherein a lubricant return bore (10) is provided in a lower part of the chock and is formed in an area of and symmetrically to a vertical center plane.

3. A rolling stand in accordance with claim 2, wherein the lubricant return bore (10) has a smaller diameter than a further lubricant return bore (13).

4. A rolling stand in accordance with claim 2, wherein the lubricant return bore (10) consists of several bores (20).

5. A rolling stand in accordance with claim 2, wherein the lubricant return bore (10) is designed as a slot (21).

6. A rolling stand in accordance with claim 3, wherein the lubricant return bore and the further lubricant return bore are brought together on the discharge side (4).

* * * * *

UNITED STATES PATENT AND TRADEMARK OFFICE
CERTIFICATE OF CORRECTION

PATENT NO.       : 8,371,148 B2
APPLICATION NO.  : 12/226130
DATED            : February 12, 2013
INVENTOR(S)      : Keller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this
First Day of September, 2015

Michelle K. Lee
*Director of the United States Patent and Trademark Office*